No. 876,072. PATENTED JAN. 7, 1908.
T. MATZKE.
ROPE DRUM OF HOISTING ENGINES.
APPLICATION FILED FEB. 18, 1907.

Witnesses:
O. F. Nagle.
L. Douville.

Inventor.
Theodor Matzke.
By Biederstein & Fairbanks.
Attorneys.

UNITED STATES PATENT OFFICE.

THEODOR MATZKE, OF DISTELN, GERMANY, ASSIGNOR TO SIEG-RHEINISCHE HÜTTEN ACTIENGESELLSCHAFT, OF FREIDRICH-WILHELMS-HÜTTE, GERMANY.

ROPE-DRUM OF HOISTING-ENGINES.

No. 876,072.          Specification of Letters Patent.          Patented Jan. 7, 1908.

Application filed February 18, 1907. Serial No. 357,911.

*To all whom it may concern:*

Be it known that I, THEODOR MATZKE, a subject of the Emperor of Germany, residing at Disteln, Westphalia, Germany, (and whose post-office address is Disteln, Westphalia, Germany,) have invented an Improvement Connected with the Rope-Drums of Hoisting-Engines, of which the following is a specification.

Hitherto the two parts of the boss or collar of the rope drums of hoisting or winding engines have been generally connected together by means of screws and with this method of connection the trouble has been that owing to the non-uniform wear of the screws and screw holes the strain falls only on a small number of the connecting screws, with the result that, these are overstrained and very often bent and sheared. When it is desired to withdraw the old screws and replace them by new ones the operation is usually a very troublesome and tedious one as the bent screws are difficult to remove and sometimes even have to be bored out. A well known method of attempting to loosen the screws is to make the hoisting engine work backwards and forwards and this very often leads to breakages.

The object of the present invention is to so connect the parts of the boss of the drum that the work entailed by the transmission of power instead of being borne only by the screws as hitherto is borne by one or more friction rings or projections which fit into corresponding recesses. These friction rings or projections are held securely in their recesses by means of binding screws and they can be loosened, when desired, by means of suitable releasing screws.

Figure 1:
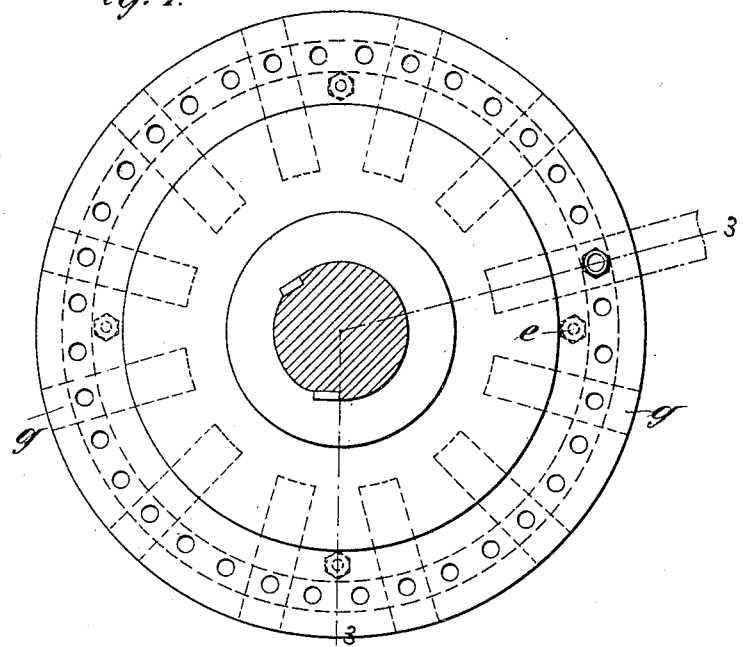
Figure 2:
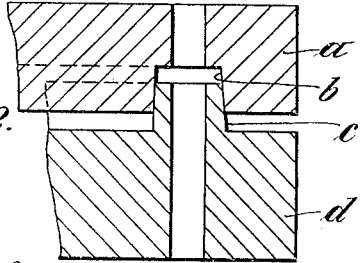
Figure 3:
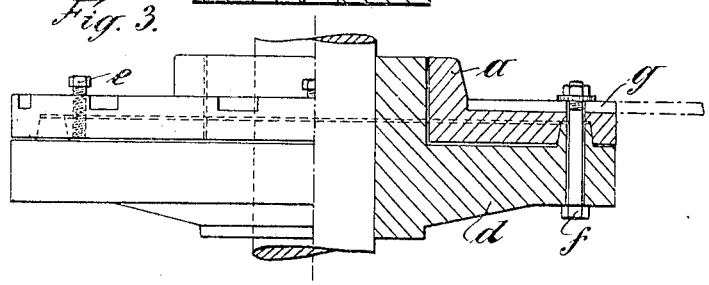

In order that my invention may be properly understood I have shown one arrangement of the invention, by way of illustration or example, in Figs. 1 to 3 of the drawing hereto annexed and in which Figure 1 is an elevation with the shaft in cross section. Fig. 2 is a sectional detail, on an enlarged scale, and Fig. 3 is a section taken on the line 3—3 of Fig. 1, with parts in elevation.

On the drawing:—$d$ is the driving boss or collar of the usual rope drum and which is keyed or otherwise fixedly secured to the driving shaft. Fitted loosely on the boss $d$ is a ring $a$ which is provided with radial grooves $g$ to receive the spokes of the rope drum. The boss $d$ of the drum is provided with a friction ring $c$ which fits into a corresponding annular groove $b$ in the part $a$.

Instead of a single friction ring, as shown on the drawing, several friction rings may be used.

$f$ are binding screws and $e$ are releasing screws.

The arrangement is such that when the binding screws $f$ are tightened up, the friction ring $c$ is firmly pressed into the corresponding annular groove $b$ on the part $a$ thus coupling together the two parts of the boss of the rope drum. With this arrangement the strains due to the transmission of power are borne principally by the friction ring $c$ in place of by the screws $f$, and bending and shearing of the latter or any irregular wear of the screw holes, is thus obviated.

When desired, the rope drum can be disconnected in a very short time by loosening the binding screws $f$ by means of the releasing screws $e$ and pulling the parts $a$ and $d$ separate.

Having now fully described my invention what I claim and desire to secure by Letters Patent is:—

1. A hoisting drum boss made in two parts, one part fixed to its shaft, said shaft being common to both parts, and the other part sleeved upon the first-named part, and frictional coöperating interengaging portions.

2. A hoisting drum boss made in two parts one part having an annular projection thereon, the other part sleeved upon the first named part and having a corresponding annular recess and means for fastening the parts together.

3. A hoisting drum boss made in parts comprising in combination, a part fixed to the shaft, a part secured to the drum and having an opening through which the hub of the other part passes, a friction ring on the one part, a recess for the reception of the ring on the other part and means for connecting the parts together.

4. A hoisting drum boss made in parts comprising, in combination, a collar fixed to the shaft, a ring connected to the drum and having radial spoke-receiving grooves, a friction ring on the collar, a corresponding groove on the ring and means for fastening the ring to the collar.

5. A hoisting drum boss formed in parts, one having a shaft-receiving portion, and a concentric friction ring, a ring fitted loosely on said boss and having radial spoke-receiving grooves, and a concentric annular groove to receive said ring, means passed through said ring for securing said parts together, and independent releasing means mounted in said ring and engaging said boss.

In testimony whereof I affix my signature in presence of two witnesses.

THEODOR MATZKE.

Witnesses:
BESSIE F. DUNLAP,
LOUIS VANDORY.